US 6,435,718 B1

(12) United States Patent
Weiss et al.

(10) Patent No.: US 6,435,718 B1
(45) Date of Patent: Aug. 20, 2002

(54) LINEAR MOTION BEARING ASSEMBLY WITH INTEGRAL PERFORMANCE ENHANCING FEATURES

(75) Inventors: Walter W. Weiss, West Hempstead; Eric Kim, Flushing; Gregory S. Lyon, Mamaroneck; Alison Ng, New York; Thomas F. Greenfield, Hauppauge, all of NY (US)

(73) Assignee: Thomson Industries, Inc., Port Washington, NY (US)

( * ) Notice: Subject to any disclaimer, the term of this patent is extended or adjusted under 35 U.S.C. 154(b) by 0 days.

(21) Appl. No.: 09/674,206

(22) PCT Filed: Apr. 29, 1999

(86) PCT No.: PCT/US99/09320

§ 371 (c)(1),
(2), (4) Date: Oct. 27, 2000

(87) PCT Pub. No.: WO99/56026

PCT Pub. Date: Nov. 4, 1999

Related U.S. Application Data

(60) Provisional application No. 60/083,555, filed on Apr. 29, 1998.

(51) Int. Cl.$^7$ .................................................. F16C 29/06
(52) U.S. Cl. ............................................ 384/13; 384/45
(58) Field of Search ............................ 384/13, 45, 44, 384/43; 464/168

(56) References Cited

U.S. PATENT DOCUMENTS 3,951,473 A * 4/1976 Olschewski et al. ........... 384/43
4,240,673 A * 12/1980 Ernst et al. .................... 384/44
5,741,078 A * 4/1998 Sasaki ........................... 384/13

* cited by examiner

Primary Examiner—Lenard A. Footland
(74) Attorney, Agent, or Firm—Dilworth & Barrese, LLP.

(57) ABSTRACT

A self-lubricating bearing assembly for supporting a load on a guide rail which includes a carriage having first and second ends, a guide surface adapter for translation atop the guide rail and an end cap assembly which mounts adjacent one of the ends of the carriage. The end cap assembly includes a seal and a lubricating assembly having a lubricating block made from a lubricant composition and a compression housing for enclosing a periphery of the lubricating block and for biasing the lubricating block against the guide rail to cause the lubricant to contact the rail.

20 Claims, 10 Drawing Sheets

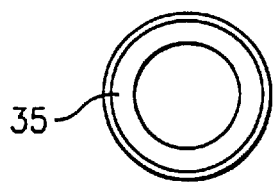
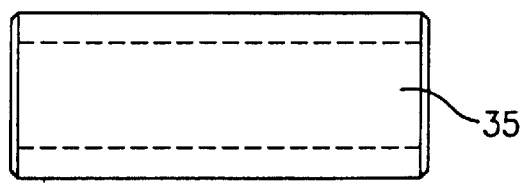
FIG. 2A  FIG. 2B
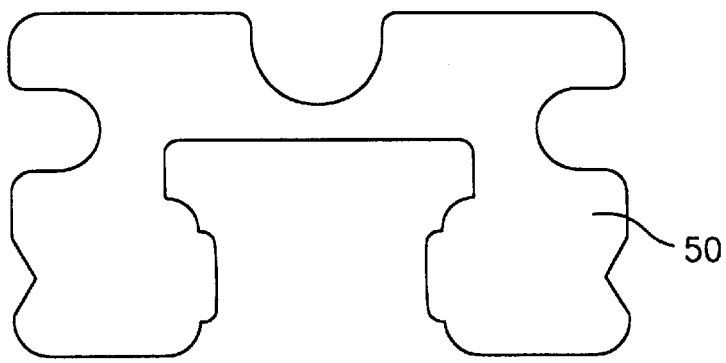
FIG. 3
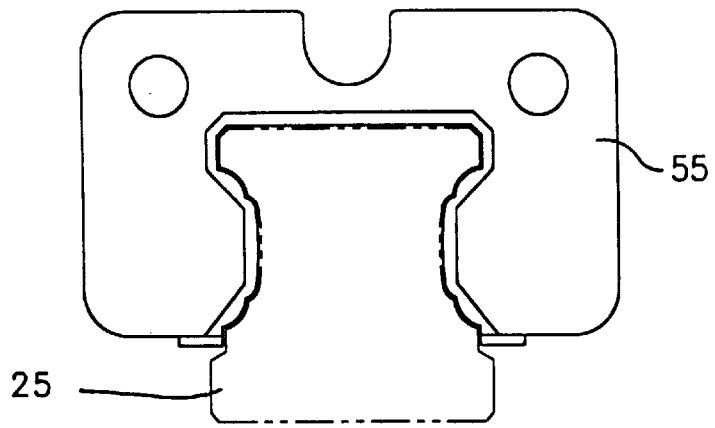
FIG. 4

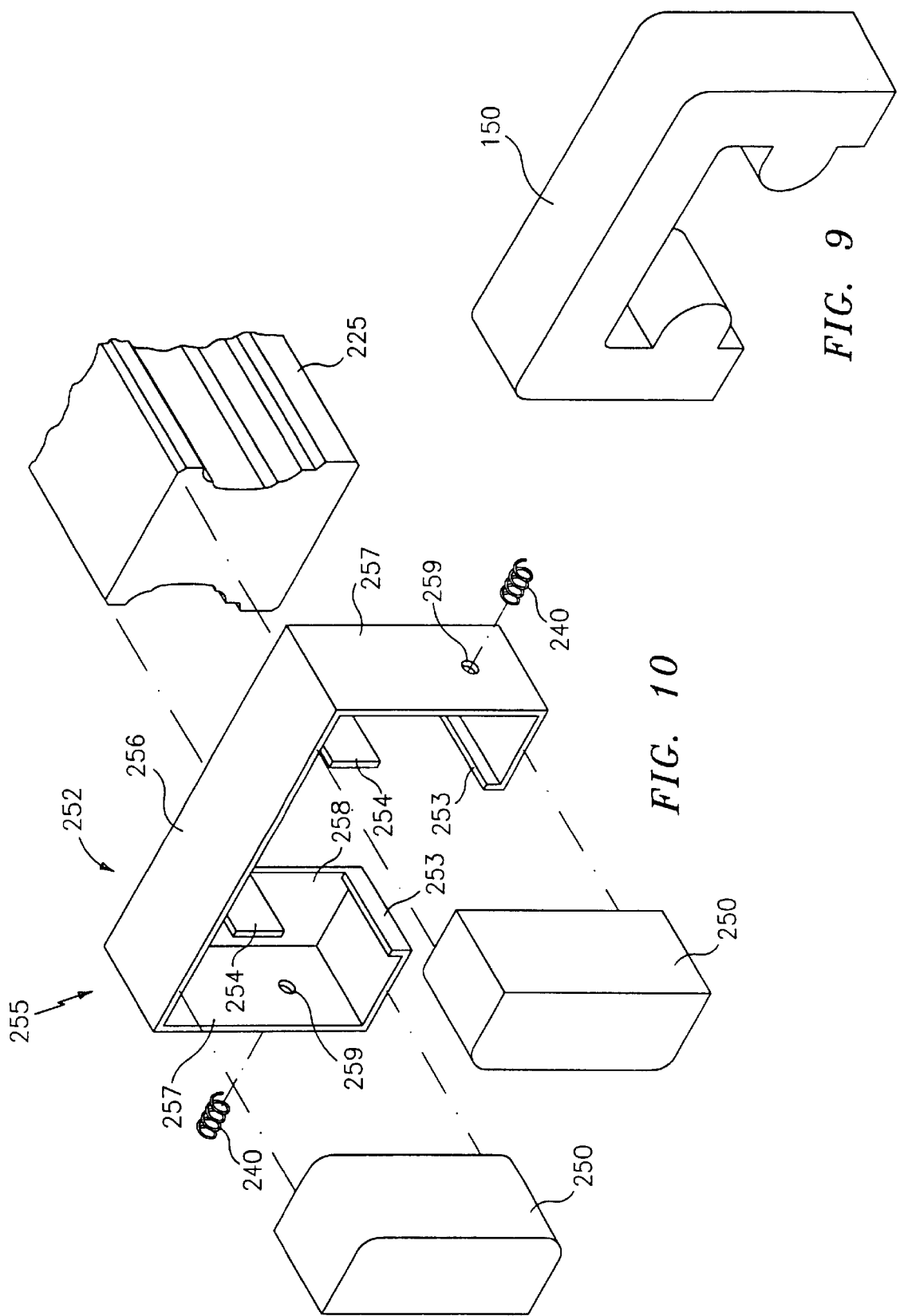

LINEAR MOTION BEARING ASSEMBLY WITH INTEGRAL PERFORMANCE ENHANCING FEATURES

This Application is A 371 of PCT/US99/09320 Apr. 29, 1999 which claims Benefit of Ser. No. 06/083555 Apr. 29, 1998.

BACKGROUND

The present disclosure relates to linear motion bearing assemblies which include components that are integrally attached to provide performance enhancing characteristics. More particularly, the present disclosure relates to linear motion bearing assemblies which include components designed to minimize the routine maintenance and enhance the performance characteristics of linear motion bearing assemblies.

TECHNICAL FIELD

Linear motion bearing assemblies or rolling element bearing assemblies of the type discussed herein are well known in the art and are typically utilized for the movement of machine parts, tools and masses. These assemblies typically include a bearing carriage mounted for movement along a shaft or along a modified Y-beam, I-beam or T-beam cross section rail. As used herein the terms rail and shaft are used interchangeably. Load bearing and return tracks are provided in association with the bearing carriage for re-circulating a plurality of rolling elements such as, for example, balls or rollers. These rolling elements travel alternately through the load bearing tracks and return tracks to facilitate movement of the bearing carriage along the rail with minimum friction.

The use of roller element bearings is especially conspicuous in the machine tool industry where requirements of accuracy, stiffness, reliability and repeatability are stringent. This type of bearing, e.g., U.S. Pat. No. 4,932,067, is typically constructed from monolithic components of both rail and carriage, with rolling elements (usually balls or rollers) disposed between the two bodies. See also U.S. Pat. No. 5,558,442. Provisions are commonly made for the circulation of the rolling elements via retainers, end caps, turnarounds or the like. Typically, provisions are also made for seals or devices intended to retain lubricant and prohibit the ingress of debris.

End caps are usually located on the ends of the bearing carriage and may have turnarounds formed therein for transferring the rolling elements from the load bearing tracks to the return tracks. The turnarounds typically comprise a semi-toroidal shaped track dimensioned and configured for the particular rolling element being employed. At the center of the semi-toroid, an internal guide may be provided to smooth the movement of the rolling elements in the turnarounds.

As can be appreciated, the operation and efficiency of a linear motion bearing is heavily influenced by the type of lubricant, the frequency the lubricant is introduced into the bearing and the amount of lubricant introduced. As a result, the performance of the bearing can be detrimentally influenced by the ingress of contaminants, such as machining chips, weld spatter, etc.

Linear motion bearing lubrication has typically been provided by 1) manual application by use of a grease gun or the like (See, for example, U.S. Pat. No. 4,932,067); 2) automatic lubrication via a centralized lubricant dispenser; or 3) through the use of rubber or synthetic resin impregnated with a lubricant and typically mounted on a carriage in position to contact a rail. (See, for example, U.S. Pat. Nos. 5,492,413, 5,494,354, 5,590,965 and 5,769,543.) Manual lubrication is very effective when the operator has access to the lubrication points. When access is limited, it is not unusual for that bearing to suffer a lubrication failure. Centralized lubrication is highly effective, but requires great expense and complication in the realization of the pump system,. the delivery lines and the attendant fittings. The lubricant impregnated rubber or synthetic resin blocks of the prior art typically require integral stiffeners or integral tensioners to facilitate uniform application of lubricant over time. The blocks are exposed to environmental conditions and contaminants.

Attempts have been made to address to these concerns and to provide self-lubricating properties to the bearing. U.S. Pat. No. 5,570,958 teaches a drawer slide type of bearing that contains a strip of lubricant-filled polymer. This strip of lubricating material contacts the rolling elements by incidental contact during re-circulation. Thus the rolling elements are intended to have sufficient lubricant on the surface as they enter the loaded region.

In the case of the '958 patent, the incidental contact of rolling elements with the lubricating strip is not sufficient, over extended periods, to deposit consistent amounts of lubricant. Thus, under any but the least stringent applications, a lubrication failure would be expected.

Thus, it would be highly desirable to provide a linear motion bearing that is simple to assemble and acts in a consistent, self-lubricating fashion reducing environmental contamination and extending bearing life. Additionally, it would be highly desirable to provide a bearing that will remove debris attached to the rail, prohibit the ingress of contaminants and/or provide a simple means of attaching an end cap or the like for the same purpose. Lastly, it would be highly desirable to provide a bearing where these and other features may be added and/or deleted in a simple manner depending upon the particular bearing application involved.

SUMMARY

Accordingly, the present disclosure is related to linear bearings which provide an enclosed self-lubrication system, scraping ability, enhanced sealing and other features arranged in a simple building-block manner. Further, each of the above-mentioned features may be added or omitted from the building-block arrangement depending upon the particular bearing application involved.

One embodiment of the present disclosure includes a self-lubricating bearing for supporting a load on a guide rail which includes a carriage having first and second ends, a guide surface adapted for translation atop the guide rail and an end assembly which mounts to one of the ends of the carriage. The end assembly includes a seal and a self contained lubricating assembly using a polymer block made from a synthetic lubricant composition. The lubricating assembly also includes a radially compressive housing enclosing the perimeter of the polymer block and biasing the polymer block against the guide rail to cause the synthetic lubricant to lubricate the bearing.

In one embodiment, the biasing force is accomplished by providing a mechanical interface, e.g., a T-shaped detent or a V-shaped wedge, which engages a complimentary mechanical interface, e.g., groove, formed within the polymer block. In another embodiment, the compressive housing is selectively adjustable.

Yet in another embodiment, the lubricating assembly is engaged with the end assembly in a press-fit manner and includes a plurality of radial slits to facilitate press-fit engagement within the end assembly. Still other embodiments of the present disclosure include end assemblies which include scrapers for removing excess debris from the rail during translation and positioning disks, spacers and/or alignment racks for positioning the various components of the end assembly.

One embodiment includes a self-lubricating bearing having a carriage with a guide surface adapted for translation along the guide rail and an enclosed ring-shaped end housing which mounts to at least one of the ends of the carriage. The ring-shaped end housing includes a plurality of flexible fingers arranged in spaced array about an inner periphery of the end assembly. Each of the flexible fingers biases the polymer block against a portion of the rail to consistently lubricate the rail.

BRIEF DESCRIPTION OF THE DRAWINGS

FIG. 2a is an end view of a stand-off of FIG. 1;

FIG. 2b is a side, elevational view of the stand-off of FIG. 1;

FIG. 3 is a front, elevational view of the lubed polymer of FIG. 1;

FIG. 4 is a front, elevational view of the seal of FIG. 1;

FIG. 9 is an isometric view of an alternate embodiment of the lubed polymer block;

FIG. 10 is an alternate embodiment of a self-contained sealed housing for the lubricating assembly according to the present disclosure showing coil springs for regulating the contact pressure of the polymer against the guide rail;

DETAILED DESCRIPTION OF THE PREFERRED EMBODIMENTS

Figure 1:
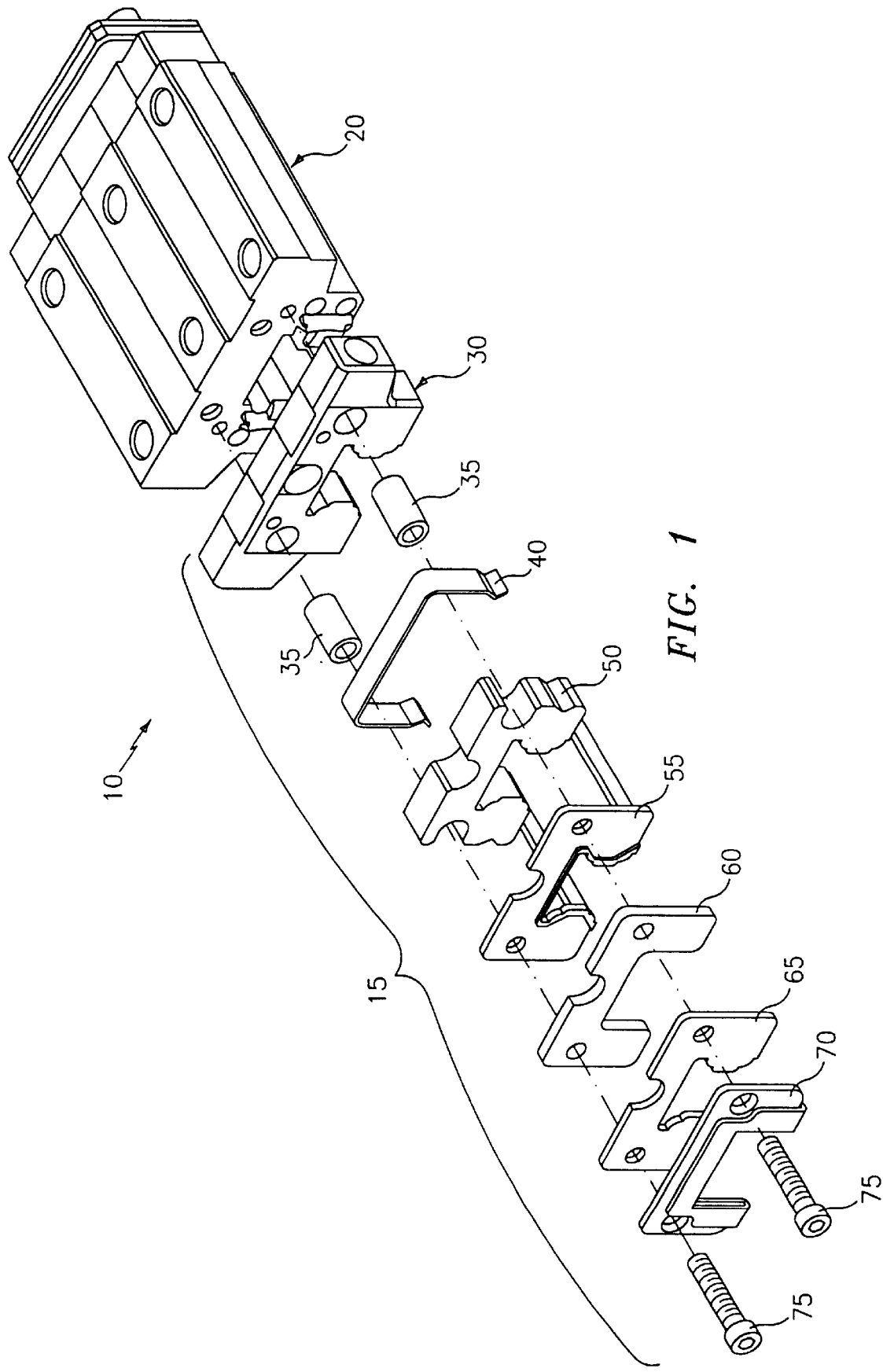
FIG. 1 is an exploded, isometric view of a self lubricating linear motion bearing having multiple stacked components according to the present disclosure.
Figure 7:
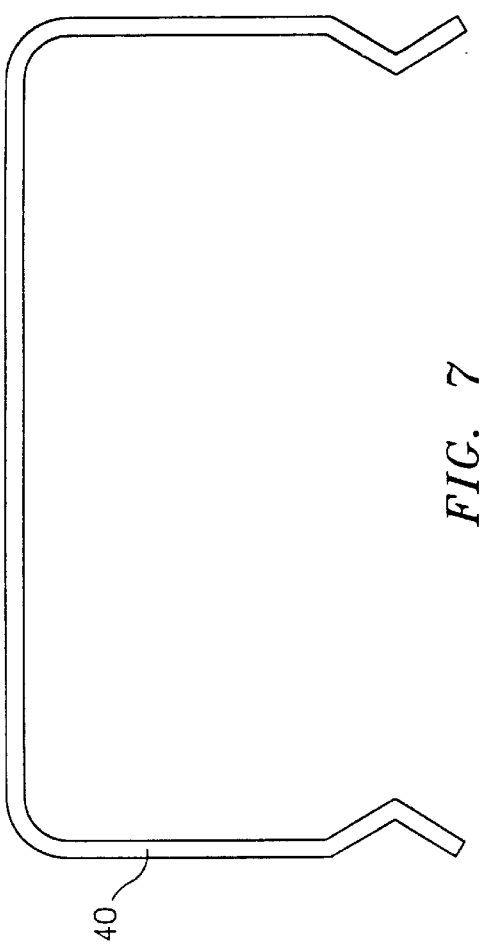
FIG. 7 is a front, elevational view of the compressive housing of FIG. 1.
Figure 5:
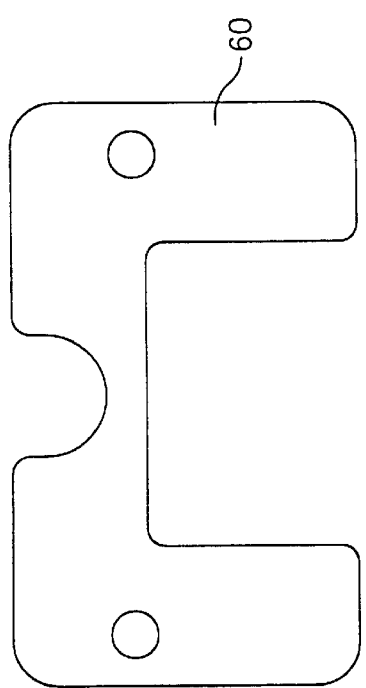
FIG. 5 is a front, elevational view of the spacer of FIG. 1.
Figure 6:
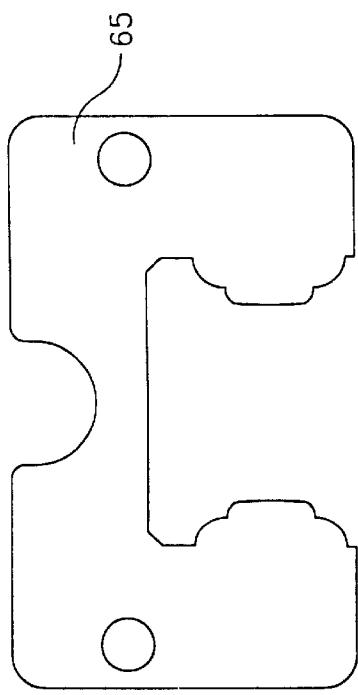
FIG. 6 is a front, elevational view of the scraper of FIG. 1.

The drawings in which like reference numerals identify similar or identical components throughout several views, there is illustrated a linear motion bearing assembly with integral performance enhancing features in accordance with the principles of the present disclosure. Turning now to FIG. 1 which is an exploded view of one embodiment of the linear motion bearing 10 according to the present disclosure which includes a pair of fasteners 75 which pass through and mount a bellows clip 70, scraper 65 (See FIG. 6), a spacer 60 (See FIG. 5), a seal 55 (See FIG. 4) and a pair of standoffs 35 (See FIGS. 2A and 2B) against an end cap 30 of a bearing carriage 20. The scraper 65 removes excess debris and/or contaminants from the guide rail 25 as the linear bearing 10 translates along the rail 25. The standoffs 35 facilitate mounting of a lubricating polymer block 50 (See FIG. 3) and a compressive housing 40 (See FIG. 7) between the end cap 30 and the seal 55. The compressive housing 40 substantially encloses the perimeter of the polymer block 50 to protect the assembly from contamination and to inhibit evaporative losses of lubricant from the polymer block 50. Housing 40 also promotes contact between the polymer block 50 and the rail 25 (FIG. 10).

Figure 8:
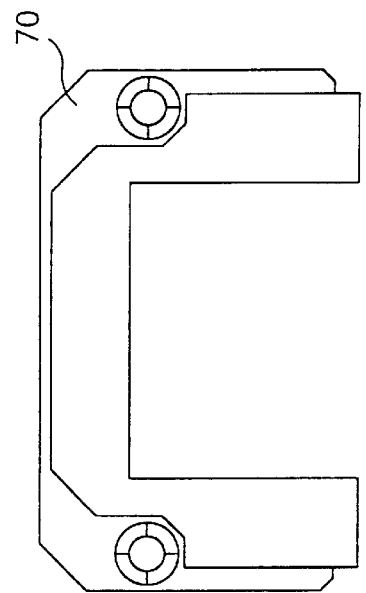
FIG. 8 is a front, elevational view of the bellows attachment clip of FIG. 1.

Typically, a bellows clip 70 (See FIG. 8) is mounted between the fasteners 75 and the scraper 65. It is envisioned that the polymer block 50 is impregnated with a lubricant to lubricate the bearing 10 and the housing 40 ensures consistent and constant contact between the rail 25 and the polymer block 50 as the polymer block 50 shrinks due to the lubricant weeping therefrom. Preferably, the lubricating polymer block 50 is made from a synthetic lubricant composition.

The end cap assembly 15, made up of clip 70, scraper 60, seal 65, polymer block 50, housing 40, end cap 30 and standoffs 35, is mounted in a sequential stacked configuration to carriage 20 as shown. It is envisioned that the amount of inward or contractile force exhibited by the compressive housing 40 (See FIG. 7) correlates to the amount of lubrication deposited on the guide rail 25 for self-lubricating the linear motion bearing 10. It is also contemplated that compressive housing 40 can be manufactured with varying contractile forces depending upon the desired amount of lubricant needed for a particular linear motion bearing 10. Also, various lubricating polymers 50 can be employed and/or easily substituted depending upon the particular purpose and/or load requirements of the bearing 10.

It is also envisioned that by manufacturing the end assembly 15 to include an internal self-lubricating system and by designing the end assembly 15 to easily mount to the end of the carriage 20 will greatly simplify the assembly process. In addition, in the case of a lubrication failure, the end assembly 15 can be easily replaced and a new end assembly 15 containing a new polymer block 50 can be easily mounted to the carriage 20. The various components or combinations of the various components of the end cap assembly 15 can be easily substituted and/or replaced with alternate embodiments without departing from the scope of the present disclosure. For example and as illustrated in FIGS. 9–28, the components can be specifically designed for different rail cross-sections, e.g., I-beam, T-beam, Y-beam and circular, and end cap configurations.

More particularly and by way of example, FIG. 9 shows one embodiment of the lubricating polymer block 150 which is designed for use with a linear bearing having an I-shaped rail 25 such as the ACCUGLIDE® manufactured by Thomson Industries, Inc. It is contemplated that the polymer block 150 of FIG. 9 can be mounted within compressive housing 40 of FIG. 1, however, it is not beyond the scope of the present disclosure to use a differently shaped compressive housing 40 which is specifically designed and shaped to further enhance the lubricating characteristics of polymer block 150.

FIG. 10 shows an alternate embodiment of the FIG. 1 linear motion bearing 10 having a lubricating assembly 255 which includes a generally rectilinear housing 252 having a top 256, two L-shaped sides 257 and a back plate 258 which together encapsulate and retain two blocks of lubed polymer material 250 in opposing relation relative to one another by way of a plurality of lower and upper flanges 253 and 254, respectively. The two L-shaped sides 257 depend from top 256 and each have an aperture 259 formed therein for receiving a coil spring 240 which selectively adjusts the biasing pressure of the polymer blocks 250 against the guard rail 25 which, in turn, lubricates the linear bearing 10. It is envisioned that other types of mechanically adjustable interfaces could be employed to apply consistent biasing pressure to the polymer block 250, e.g., a screw or a camming mechanism.

Figure 11:
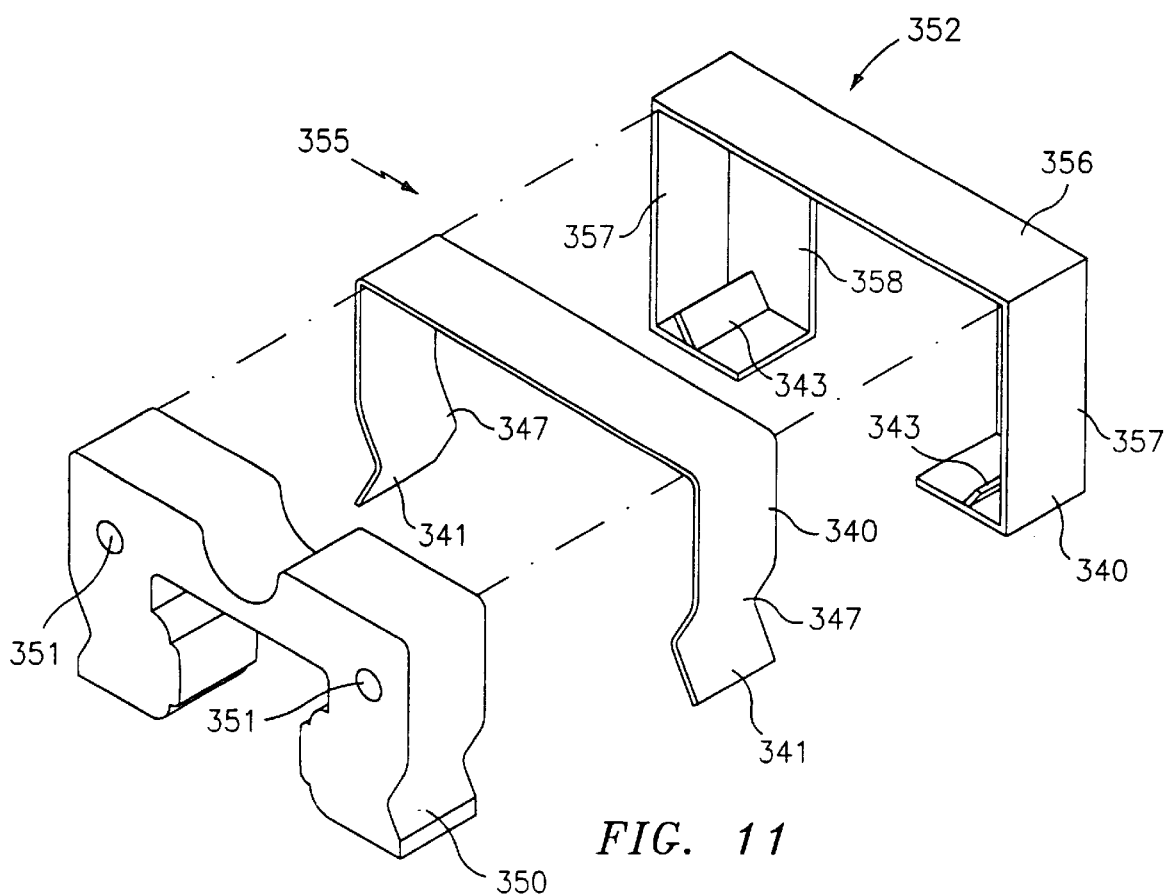
FIG. 11 is an alternate embodiment of the lubricating assembly according to the present disclosure showing an enclosed compression member which biases the polymer against the guide rail while inhibiting contamination of the polymer and/or bearing assemblies.

FIG. 11 shows an alternate embodiment of a lubricating assembly 355 which includes a generally rectilinear housing 352 having a top 356, two L-shaped sides 357 and a back plate 358. The sides 357 and the back plate 358 depend from the top 356. The top 356, sides 357 and back plate 358 cooperate to encapsulate and retain a polymer block 350 within housing 352. The lower portion of each L-shaped side 357 includes an upwardly projecting flange 343 which abuts the distal ends 341 of a compressive housing 340. Preferably, the distal ends 341 flare outwardly at a projection 347 which biases the polymer block 350 against rail 225 (See FIG. 10) which, in turn, operates to prevent block 350 from collapsing inward, prohibiting the assembly to rail 225. Polymer block 350 preferably includes apertures 351 disposed therein for receiving fastening elements 75 (See FIG. 1) for mounting the lubrication assembly 355 to the carriage 20 (or end cap 30).

Figure 12A:
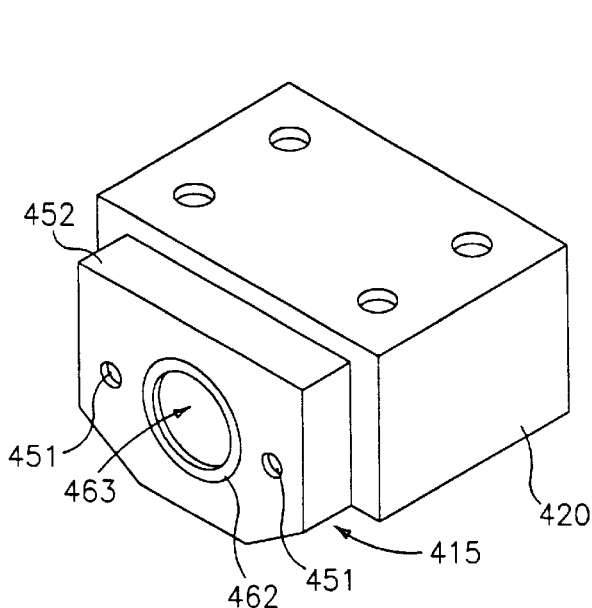
FIGS. 12A and 12B show an alternate embodiment of the linear motion bearing of the present disclosure which includes a housed lubricating assembly having an aperture for receiving the circular shaft and a lubed polymer ring which is disposed within the inner periphery of the aperture for lubricating the bearing as it slides along the shaft.
Figure 12B:
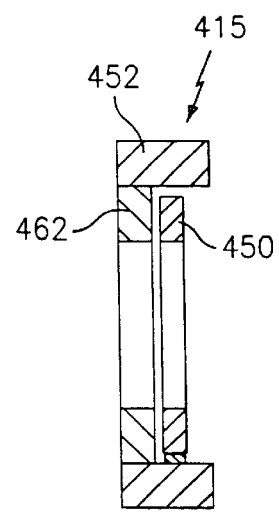
Figure 13A:
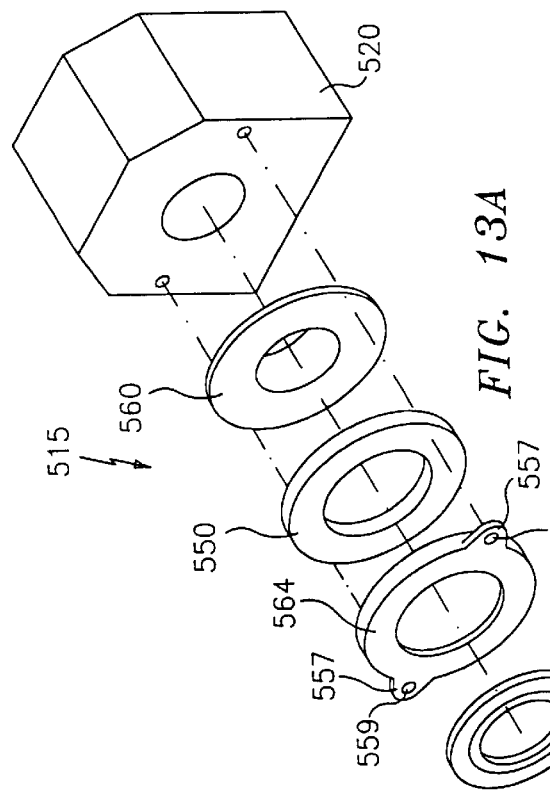
FIGS. 13A and 13B show an alternate embodiment of the linear motion bearing of the present disclosure which includes a housed lubricating assembly having a lubed polymer interposed between a retaining ring and a positioning disk.
Figure 13B:
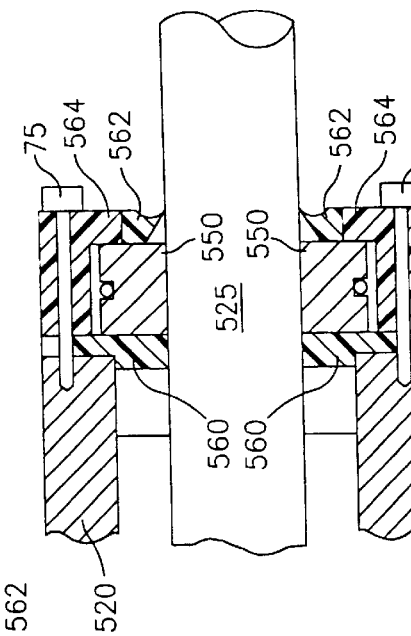

FIGS. 12A and 12B show an alternate embodiment of an end cap assembly 415 which is designed to mount directly to carriage 420 configured for movement along a shaft 525 (See FIG. 13B). The end cap assembly 415 includes a generally rectilinear housing 452 defining a central bore 463 configured to receive shaft 525. The end cap assembly 415 also includes a ring-shaped lubed polymer 450 and a ring-shaped seal 462 which are both seated within the bore 463 with the seal 462 facing outward. It is contemplated that the polymer block 450 will lubricate the bearing as it translates along the rail 525. Preferably, seal 462 retains lubricant inside the assembly 415 and prevents contaminants from entering the bearing. Housing 452 includes apertures 451 disposed therein for receiving fastening elements 75 (See FIG. 1) for mounting the end cap assembly 415 to the carriage 420.

FIGS. 13A and 13B show an alternate embodiment of the end cap assembly 515 designed to mount directly to carriage 520 which is configured for movement along shaft 525. End assembly 515 includes a ring-shaped lubed polymer 550 interposed between a positioning ring 560 and a housing 564. The housing 564 preferably includes flanges 557 which project radially from the housing 564 which each have an aperture 559 located therethrough for receiving fastening element 75 (See FIG. 1) to mount the housing 564 to the carriage 520. A ring-shaped seal 562 is enclosed by the housing 564 preferably in a press-fit or similar manner.

Figure 14A:
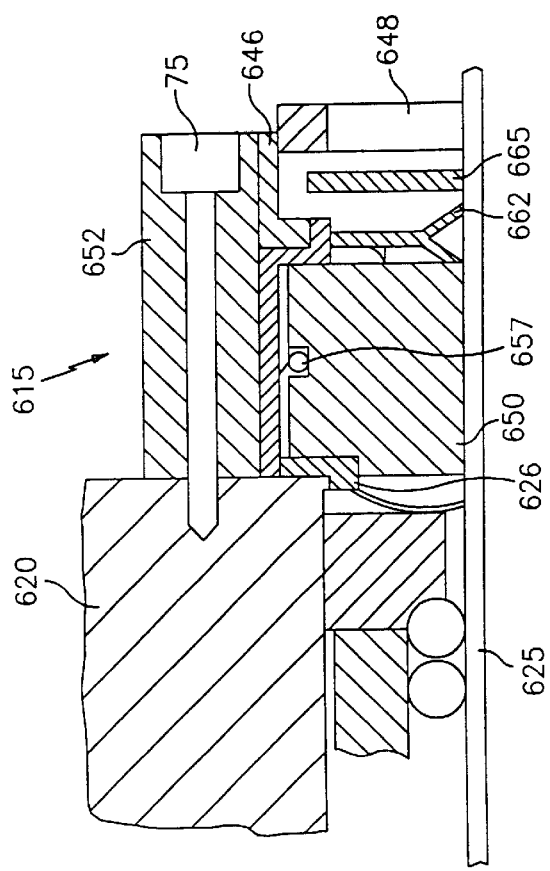
FIGS. 14A and 14B show an alternate embodiment of the linear motion bearing of the present disclosure which includes a self-contained alignment system of positioning rings and retaining rings for staging the various internal components of the enclosed lubrication assembly.
Figure 14B:
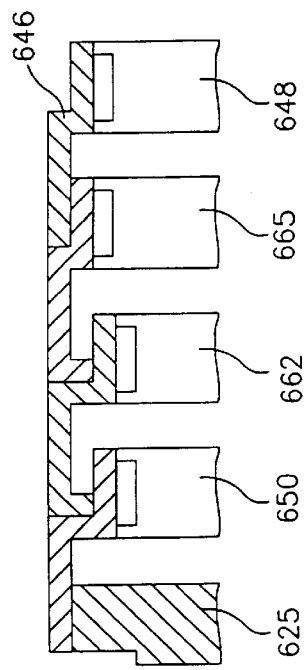

FIGS. 14A and 14B show an alternate embodiment of the end cap assembly 615 which is designed to mount directly to the carriage 620 configured for movement along a shaft 625. It is contemplated that stacking the various internal components provides a simple "building block" approach to assembling end cap assembly 615. More particularly, end cap assembly 615 includes a housing 652 defining a large internal volume for enclosing the various components, e.g., the lubed polymer block 650, scraper 665, end seal 662 and positioning ring 626. The housing 652 also includes an alignment rack 646 (See FIG. 14B) which stages the various components within the housing 652 to allow certain components, e.g., scraper 665, to float while maintaining other components, e.g., polymer block 650 and end seal 662, in a fixed manner within the housing 652. It is contemplated that as the bearing 10 translates along the shaft 625, the polymer block 650 will lubricate the shaft 625 and reduce friction, the scraper 665 will float and scrape accordingly to eliminate excess lubricant and unwanted debris from the shaft and the seal 662 will retain the lubricant inside the end cap assembly 615 in contact with the shaft 665.

Figure 15A:
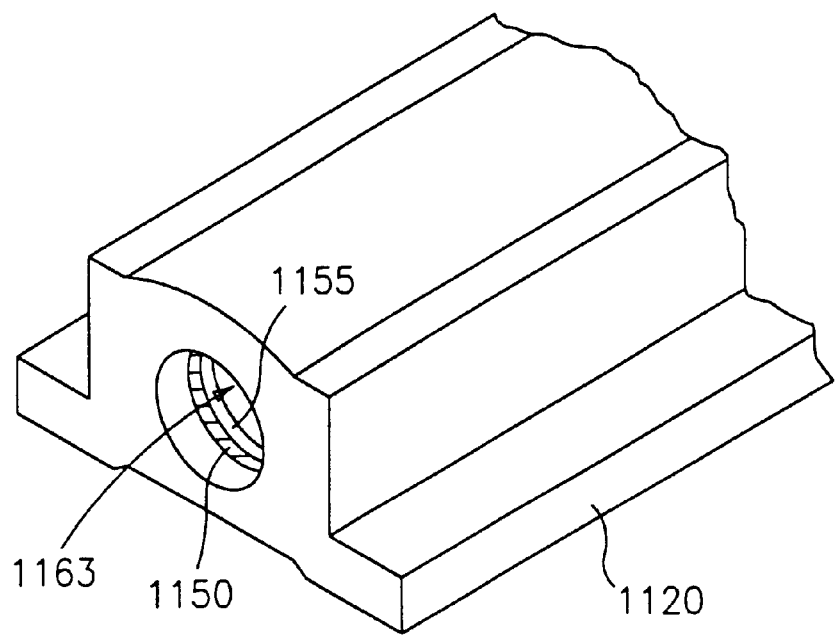
FIGS. 15A and 15B show an alternate embodiment of a pillow block having the polymer internally housed in the pillow block between the bushing and the seal with a compression ring/clip disposed within the polymer for biasing the polymer against the guide rail.
Figure 15B:
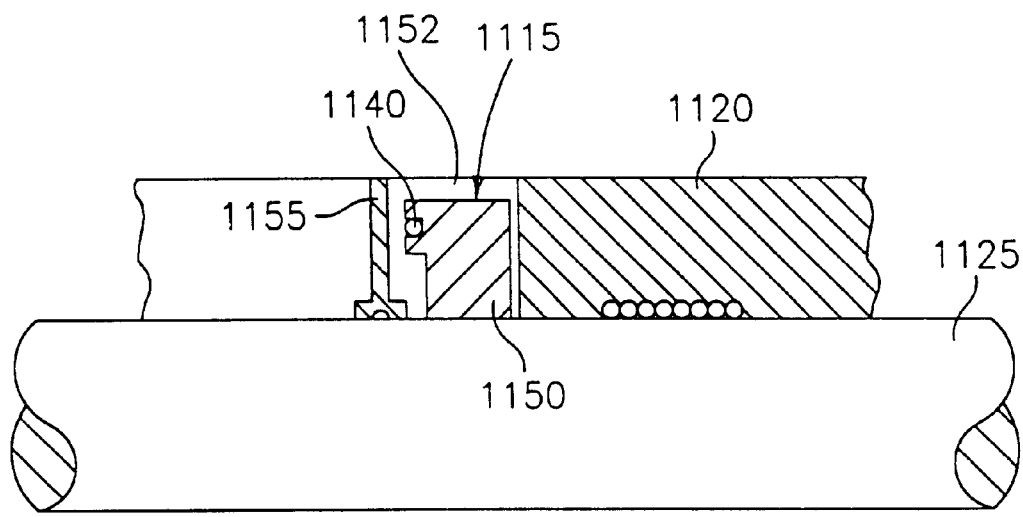

FIGS. 15A and 15B show an alternate embodiment of the end assembly 1115 which is designed to seat within a cavity formed in the ends of a pillow block 1120. More particularly, pillow block 1120 includes a central bore 1163 which is sufficiently dimensioned to slidingly receive shaft 1125 therethrough and an annular groove 1152 dimensioned to seat end assembly 1115 therein. End assembly 1115 includes a ring-shaped lubed polymer block 1150 having a compressive member 1140 engaged therein for biasing the polymer 1150 against the rail 1125 to ensure adequate contact pressure for consistently lubricating the rail 1125. A seal 1155 is also seated within annular groove 1152 to retain the lubricant within the end assembly 1115.

Figure 16:
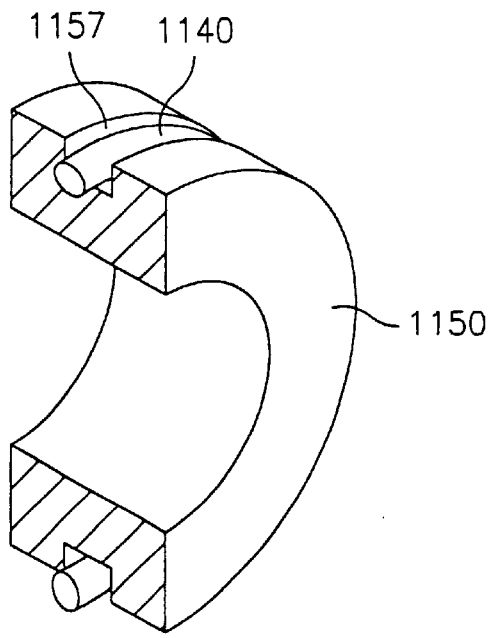
FIGS. 16 shows an alternate embodiment of a polymer block with a compression ring formed in a peripheral groove.

FIG. 16 shows a polymer block 1150 having an annular groove 1157 formed therein which receives compressive member 1140.

Figure 17A:
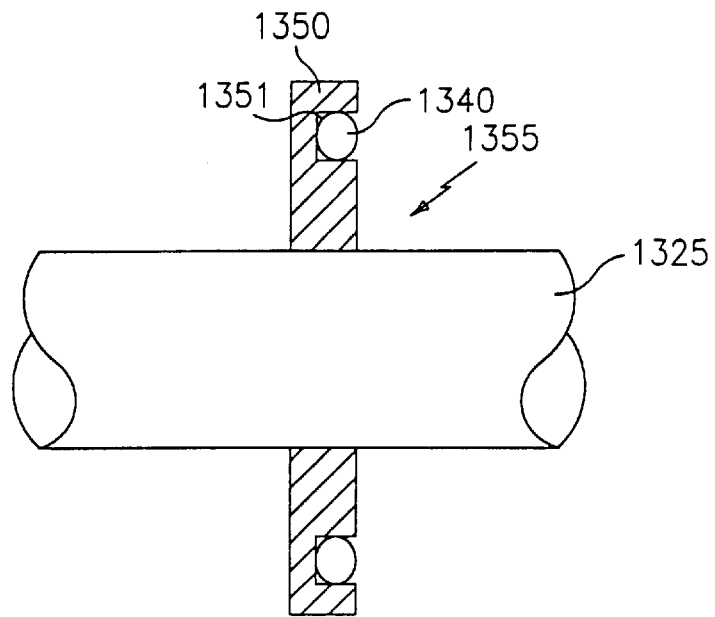
FIGS. 17A–17C show alternate embodiments of a coil-like compression member disposed within the polymer designed to fit atop a shaft.
Figures 17B, 17C:
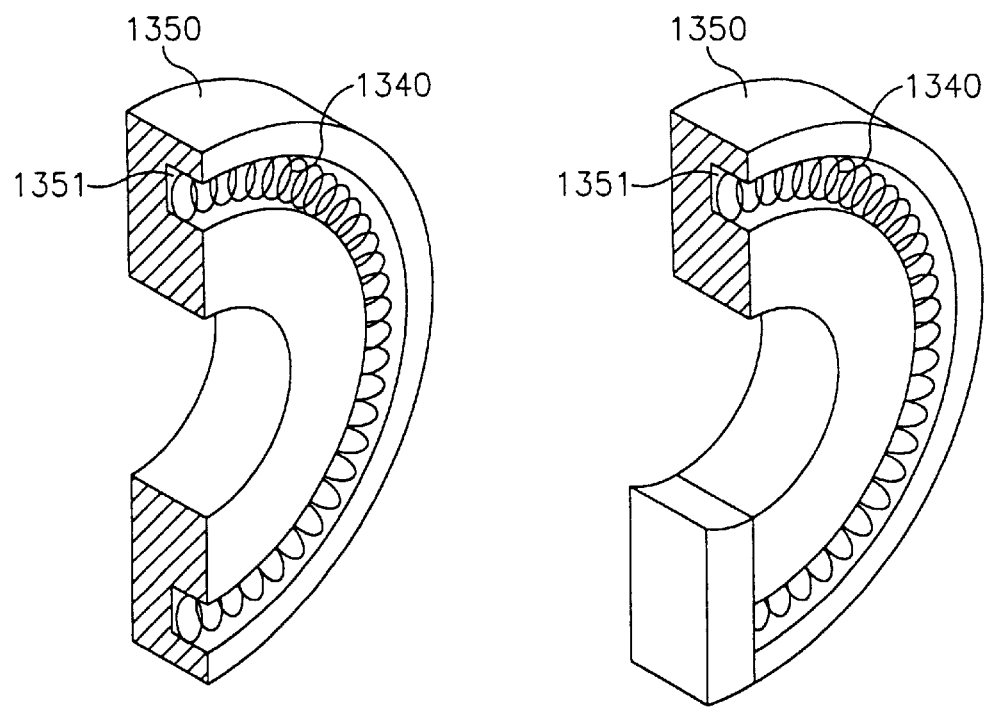

FIGS. 17A–17C show other alternate embodiments of the lubricating assembly 1355, i.e., lubed polymer block 1350 and compressive member 1340 combination. More particularly and with reference to FIGS. 17A and 17B, polymer block 1350 is molded having an annular groove 1351 formed therein which seats compressive member 1340. It is contemplated that compressive member 1340 ensures adequate contact pressure of the polymer block 1350 against the shaft 1325 for lubricating the shaft 1325. FIG. 17C shows an alternate embodiment wherein the polymer block 1350 and corresponding coil-like compressive member 1340 are semi-circular in shape which is contemplated to reduce the frictional drag between the polymer block 1350 and the shaft 1325.

Figure 18A:
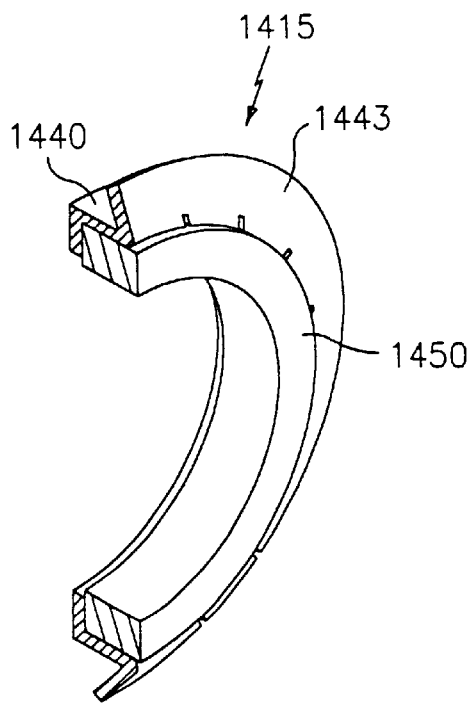
FIGS. 18A–18B show alternate press-fit designs of the lubricating assembly.
Figure 18B:
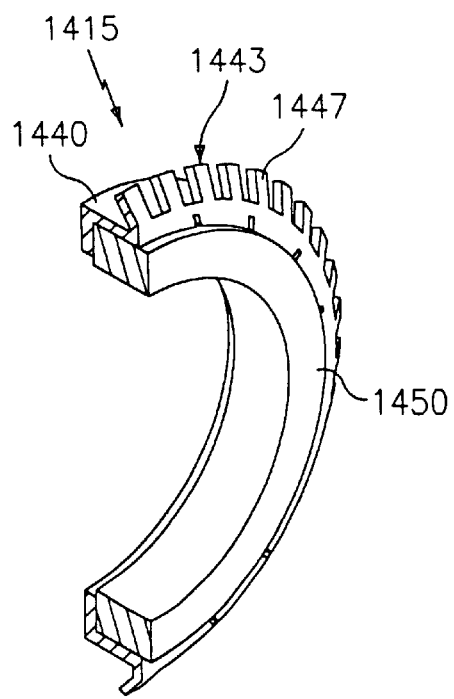

FIG. 18A shows another alternate embodiment of the compressive member 1440 which includes an annular flange 1443 which flexes inwardly to bias the polymer block 1450 against the shaft 1125 and FIG. 18B includes a similar annular flange 1443 having a plurality of fingers 1447 which also flex inwardly to bias the polymer block 1450 against the shaft 1125.

Figure 19:
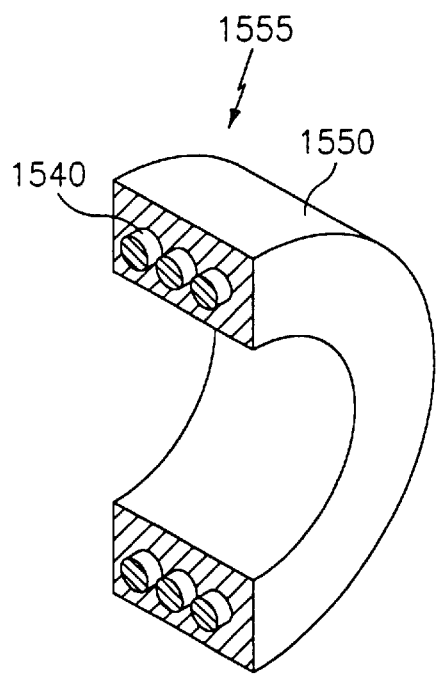
FIG. 19 shows an alternate embodiment of the polymer having a series of heating wires integrally formed therein.

FIG. 19 shows an alternate embodiment of the lubricating assembly 1555 designed to engage a shaft (not shown). More particularly, lubricating assembly 1555 includes a semi-annular polymer block 1550 having a plurality of semi-annular wires 1540 integrally formed therein. The wires 1540 may act as heating elements to thermally induce emission of lubricant from the block 1550.

Figure 20A:
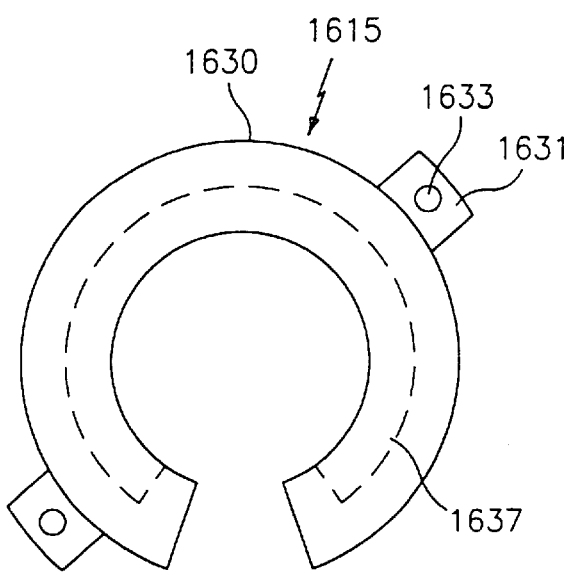
FIGS. 20A–20C show alternate embodiments of the end assembly which include a series of foldable tabs which releasable retain the polymer within the end cap.
Figure 20B:
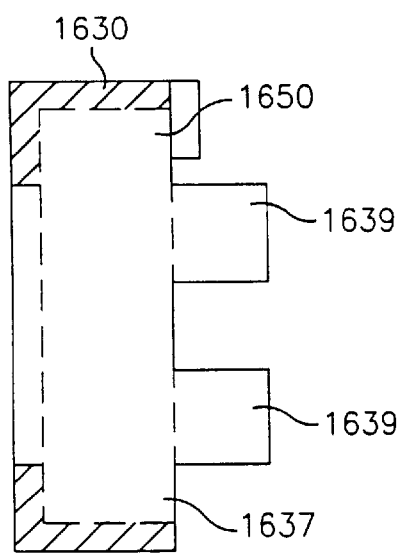
Figure 20C:
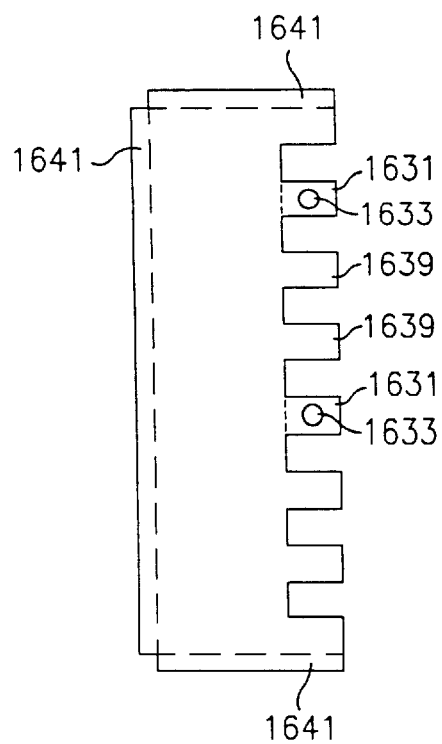

FIGS. 20A–20C show alternate embodiments of end cap assembly 1615 which are designed to mount directly to a carriage (not shown). More particularly, end cap assembly 1615 includes a semi-annular end cap 1630 having a pair of flanges 1631 which radially project therefrom each including an aperture 1633 located therein for receiving fastening element 75 (See FIG. 1) to mount the end cap 1630 to the carriage. As best shown in FIG. 20B, end cap 1630 also includes a semi-annular staged groove 1637 which is dimensioned to receive lubed polymer block 1650 therein. Tabs 1639 bend to secure the polymer block 1650 within the end cap 1630. FIG. 20C shows an alternate embodiment wherein both the flanges 1631 and the tabs 1639 bend; the flanges 1631 bend outwardly to mount the end cap 1630 to the carriage and the tabs 1639 bend inwardly to secure the lubed polymer block 1650. The FIG. 20C embodiment includes staging tabs 1641 which also bend inwardly to form a staging area for seating and securing the lubed polymer block 1650.

From the foregoing and with reference to the various figure drawings, those skilled in the art will appreciate that certain modifications can be made to the present disclosure without departing from the scope of the present disclosure. While particular embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplications of preferred embodiments. Those skilled in the art will envision other modifications within the scope and spirit of the claims appended hereto.

What is claimed is:

1. A self-lubricating bearing assembly for supporting a load on a guide rail, comprising:
   a carriage having first and second ends and a guide surface adapted for translation along the guide rail; and
   an end cap assembly which mounts to at least one of said ends of said carriage, said end assembly including an enclosed lubricating assembly having at least one lubricating block made from a lubricant composition and a housing for enclosing a peripheral portion of the lubricating block and for radially biasing said block against the guide rail.

2. A self-lubricating bearing assembly according to claim 1 wherein said housing includes a compressive member positioned adjacent an outside perimeter of the lubricating block.

3. A self-lubricating bearing assembly according to claim 2 wherein said lubricating assembly is press-fit to said end cap assembly.

4. A self-lubricating bearing assembly according to claim 3 wherein said compressive member includes a plurality of radial slits to facilitate press-fit engagement to said end cap assembly.

5. A self-lubricating bearing assembly according to claim 2 wherein said compressive member is integrally formed within said lubricating block.

6. A self-lubricating bearing assembly according to claim 5 wherein said lubricating assembly further comprises a spring configured to enhance contact between said polymer block and the rail.

7. A self-lubricating bearing assembly according to claim 1 wherein said housing is selectively adjustable.

8. A self-lubricating bearing assembly according to claim 1 wherein said end cap assembly is at least partially enclosed by said carriage.

9. A self-lubricating bearing assembly according to claim 1 wherein said lubricating block is integrally formed with said housing.

10. A self-lubricating bearing assembly according to claim 1 wherein at least a portion of said lubricating block is configured to fit the profile of the guide rail.

11. A self-lubricating bearing assembly according to claim 1 further comprising a self contained seal.

12. A self-lubricating bearing assembly according to claim 1 further comprising a scraper.

13. A self-lubricating bearing assembly according to claim 12 further comprising an alignment rack for staging and aligning said lubricating block, said seal and said scraper.

14. A self-lubricating bearing assembly according to claim 1 wherein said end cap assembly is configured to mount within a cavity formed in the carriage.

15. A self-lubricating bearing assembly according to claim 14 wherein at least a portion of said housing is pliable.

16. A self-lubricating bearing assembly according to claim 15 wherein said housing is configured to the cross sectional profile of a rail.

17. A self-lubricating bearing assembly according to claim 1 further comprising at least one spacer.

18. A self-lubricating bearing assembly for supporting a load on a guide rail, comprising:
   a carriage having first and second ends and a guide surface adapted for translation along the guide rail; and
   an end cap which mounts to one of said ends of said carriage, said end cap including at least one lubricating block made from a lubricant composition and at least one resilient finger for biasing said lubricating block against the guide rail to lubricate said bearing.

19. A self-lubricating bearing assembly for supporting a load on a guide rail, comprising:
   a carriage having first and second ends and a guide surface adapted for translation along the guide rail; and
   an end cap which mounts to one of said ends of said carriage, said end cap including:
   an internal cavity for receiving at least one lubricating block;
   a plurality of bendable tabs for releasably retaining said lubricating block within said end cap; and
   a plurality of mounting elements which extend from said end cap for mounting said end cap to said carriage.

20. A self-lubricating bearing assembly according to claim 19 further comprising a plurality of pliable flanges which can be manipulated to conform to said internal cavity.

* * * * *